(12) United States Patent
Kusuhara et al.

(10) Patent No.: US 9,543,999 B2
(45) Date of Patent: Jan. 10, 2017

(54) CARD CONNECTOR

(71) Applicant: Molex, LLC, Lisle, IL (US)

(72) Inventors: Toshitaka Kusuhara, Yamato (JP);
Naoto Yoshikawa, Yamato (JP); Koji Murakami, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/932,753

(22) Filed: Nov. 4, 2015

(65) Prior Publication Data

US 2016/0149330 A1 May 26, 2016

(30) Foreign Application Priority Data

Nov. 26, 2014 (JP) ................................. 2014-238385
Aug. 25, 2015 (JP) ................................. 2015-165665

(51) Int. Cl.
*H01R 24/00* (2011.01)
*H04B 1/3816* (2015.01)
*H01R 13/24* (2006.01)
*H04M 1/02* (2006.01)

(52) U.S. Cl.
CPC ........ *H04B 1/3816* (2013.01); *H01R 13/2442* (2013.01); *H01R 13/2464* (2013.01); *H04M 1/026* (2013.01)

(58) Field of Classification Search
CPC ........................... H01R 12/721; Y10S 493/951
USPC ........................................................ 439/630
See application file for complete search history.

(56) References Cited

U.S. PATENT DOCUMENTS

| 7,322,839 | B1* | 1/2008 | Wu ....................... G06K 13/08 |
| | | | 439/159 |
| 7,507,098 | B1* | 3/2009 | Hung ................... H01R 13/633 |
| | | | 439/159 |
| 7,824,225 | B1* | 11/2010 | Wang ................. H01R 13/2442 |
| | | | 439/630 |
| 7,913,914 | B2 | 3/2011 | Nilsson |
| 7,955,135 | B2* | 6/2011 | Wang ..................... H01R 12/57 |
| | | | 439/630 |
| 7,967,640 | B2 | 6/2011 | Hashimoto et al. |

FOREIGN PATENT DOCUMENTS

| CN | 203826608 U | 10/2014 |
| JP | 2010-135137 A | 6/2010 |
| JP | 2011-165560 A | 8/2011 |
| JP | 2015-032531 A | 2/2015 |

* cited by examiner

*Primary Examiner* — Phuong Dinh
(74) *Attorney, Agent, or Firm* — James A. O'Malley

(57) ABSTRACT

A card connector for receiving an inserted card module having electrode pads on one surface is provided. The card connector includes a housing and a plurality of terminals. The housing has a terminal holding portion. Each terminal has a base portion held in the terminal holding portion and a cantilevered arm portion extending from the base portion in a transverse direction relative to an insertion direction of the card module in plan view. The arm portion has a curved portion shaped so as to have a curved surface with a centerline of curvature positioned upwards in side view and a pair of oblique portions inclined relative to an extension direction of the arm portion on both sides of an apex portion positioned on a free end. The terminals contact the electrode pads of the card module.

7 Claims, 13 Drawing Sheets

CARD CONNECTOR

RELATED APPLICATIONS

This application claims priority to Japanese Application No. 2014-238385, filed Nov. 26, 2014, and to Japanese Application No. 2015-165665, filed Aug. 25, 2015, both of which are incorporated herein by reference in their entirety.

TECHNICAL FIELD

The present disclosure relates to a card connector.

BACKGROUND ART

Electronic devices such as mobile phones include a card connector enabling the use of various types of cards such as SIM (Subscriber Identity Module) cards.

As electronic devices become smaller, cards and card connectors become smaller, and the terminals on the card connectors become smaller too. In response, card connectors have been proposed which have triangular terminals that sufficiently increase the amount of elastic displacement despite their smaller size (see, for example, Patent Document 1).

FIG. 13 is a pair of drawings showing a card connector of the prior art. Here, (a) is a plan view and (b) is a cross-sectional view from X-X in (a).

In these drawings, 811 is the housing in the card connector made of an insulating resin material. The bottom wall of the housing 811 has a total of six terminals 851 arranged in two rows of three. Each terminal 851 has the profile of an isosceles triangle, and includes a contact portion 851c positioned at the apex portion of the isosceles triangle, a pair of arm portions 851b corresponding to a pair of sides, and a base portion 851a embedded and supported at least partially in the bottom wall of the housing 811.

In each terminal 851, when viewed from the side before a card 901 has been inserted, the contact portion 851c is positioned above the bottom wall of the housing 811, and the arm portions 851b extend linearly in an oblique direction from the base portion 851a to the contact portion 851c. Note that the contact portion 851c has a curved shape which bulges upward.

PRIOR ART DOCUMENTS

Laid-Open Patent Publication No. 2010-161012

SUMMARY OF THE INVENTION

In the card connector of the prior art, each terminal 851 is arranged so that the contact portion 851c corresponding to the apex portion of the isosceles triangle is facing upwards as shown in FIG. 13(a). In other words, each terminal 851 faces the insertion direction of the card 901. As a result, the card 901 can be inserted smoothly. However, when the card 901 is removed, the inevitable protrusions on the lower surface of the card 901 get caught on the contact portions 851c, and the terminals 851 are sometimes damaged.

It is an object of the present disclosure to solve the problem associated with the card connector of the prior art by providing a highly reliable card connector which keeps a card module from getting caught on the terminals when the card module is inserted and ejected.

The present disclosure is a card connector receiving an inserted card module having electrode pads on one surface, the card connector comprising a housing having a terminal holding portion for terminals contacting the electrode pads of the card module, each terminal having a base portion held in the terminal holding portion and a cantilevered arm portion extending from the base portion in the transverse direction relative to the insertion direction of the card in plan view, and the arm portion having a curved portion shaped so as to have a curved surface with the centerline of curvature positioned upwards in side view and a pair of oblique portions inclined relative to the extension direction of the arm portion on both sides of the apex portion positioned on the free end.

In the card connector according to another aspect of the present disclosure, the arm portion includes a flat panel portion connected to the base portion and extending parallel to the upper surface of the terminal holding portion, an apex portion connected to the leading end of the curved portion, and a forward portion positioned above the upper surface of the terminal holding portion.

In the card connector according to another aspect of the present disclosure, the shape of the arm portion in side view does not include an inflection point and the spot connected to the base portion is connected linearly to the base portion.

In the card connector according to another aspect of the present disclosure, the oblique portions include a section positioned above the upper surface of the terminal holding portion.

In the card connector according to another aspect of the present disclosure, the arm portion includes an opening passing through the arm portion in the thickness direction, and the opening has a diamond shape with one axis extending in the extension direction of the arm portion in plan view.

In the card connector according to another aspect of the present disclosure, the width dimension of the section of the arm portion excluding the opening gradually increases linearly towards the base portion from the free end of the arm portion.

In the card connector according to another aspect of the present disclosure, the terminals are arranged in rows extending in the insertion direction of the card module, and the position of the apex portion of each terminal in the rows is different relative to the transverse direction in the insertion direction of the card module.

The present disclosure is able to provide a highly reliable card connector which keeps a card module from getting caught on the terminals when the card module is inserted and ejected.

DETAILED DESCRIPTION OF THE PREFERRED EMBODIMENTS

The following is a detailed explanation of embodiments of the present disclosure with reference to the drawings.

Figure 1:
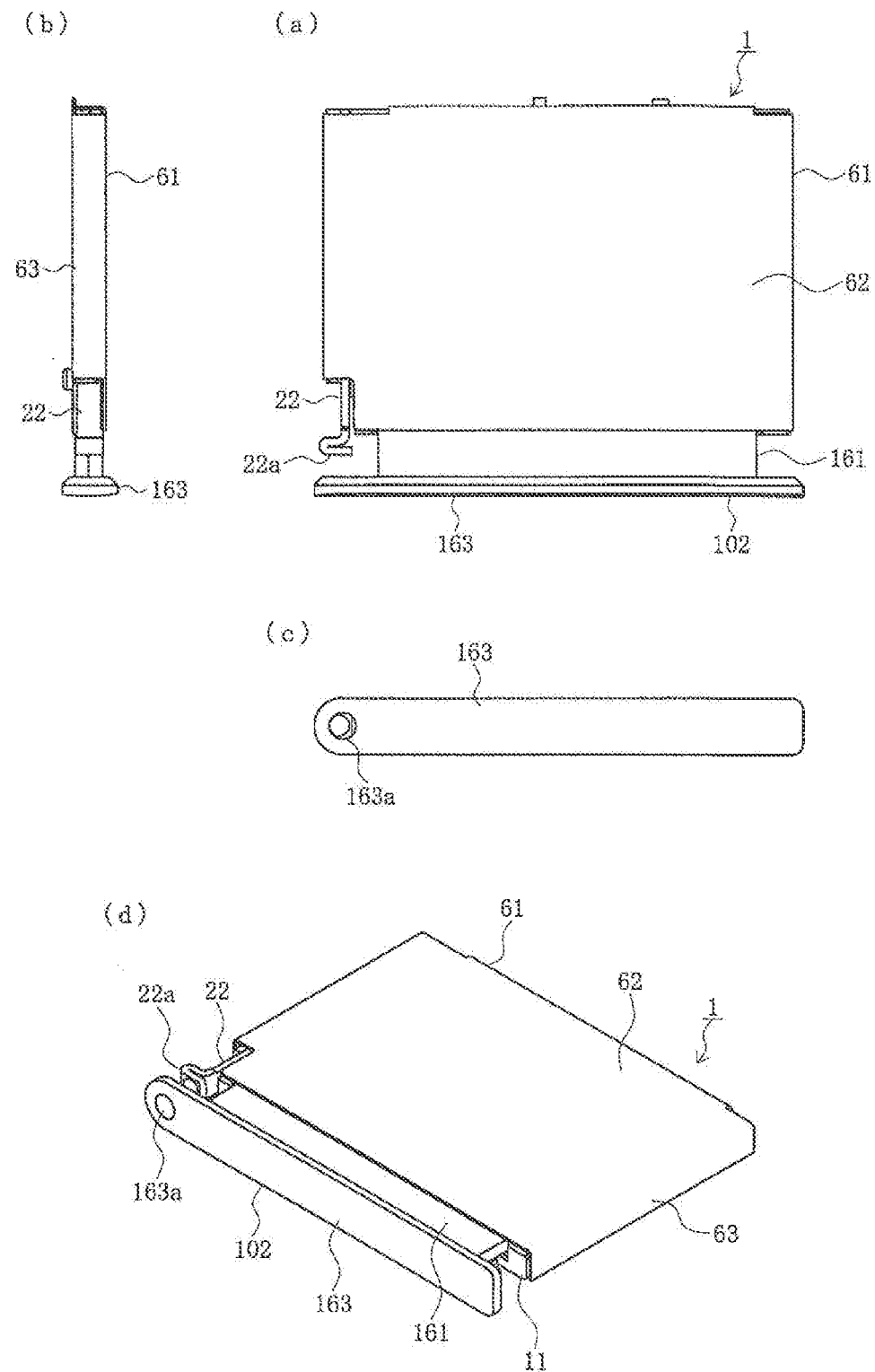
FIG. 1 is a set of drawings showing a card connector in a first embodiment of the present disclosure including an inserted card tray, in which (a) is a top view, (b) is a side view, (c) is a rear view, and (d) is a perspective view.
Figure 2:
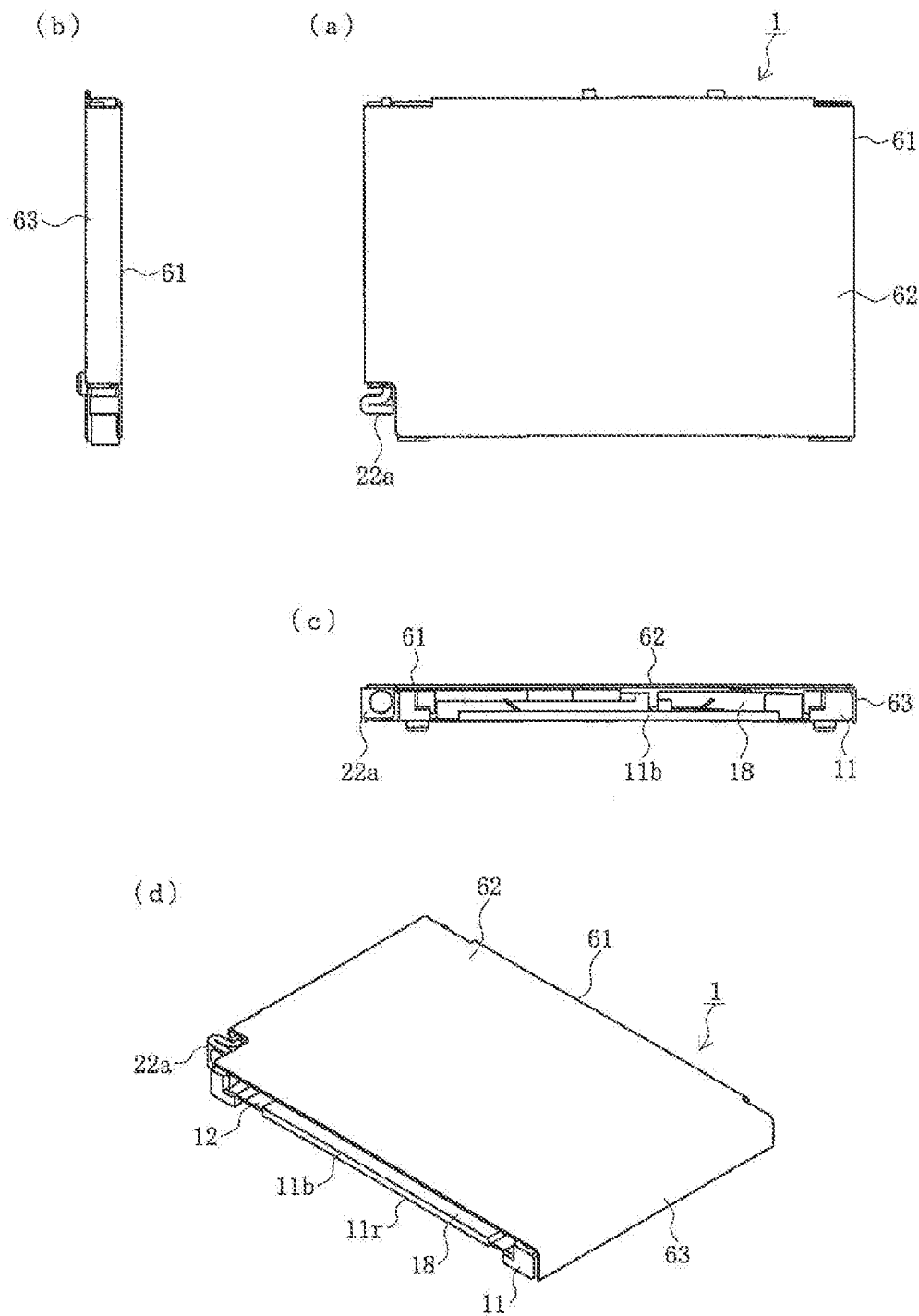
FIG. 2 is a set of drawings showing the card connector in the first embodiment of the present disclosure, in which (a) is a top view, (b) is a side view, (c) is a rear view, and (d) is a perspective view.
Figure 3:
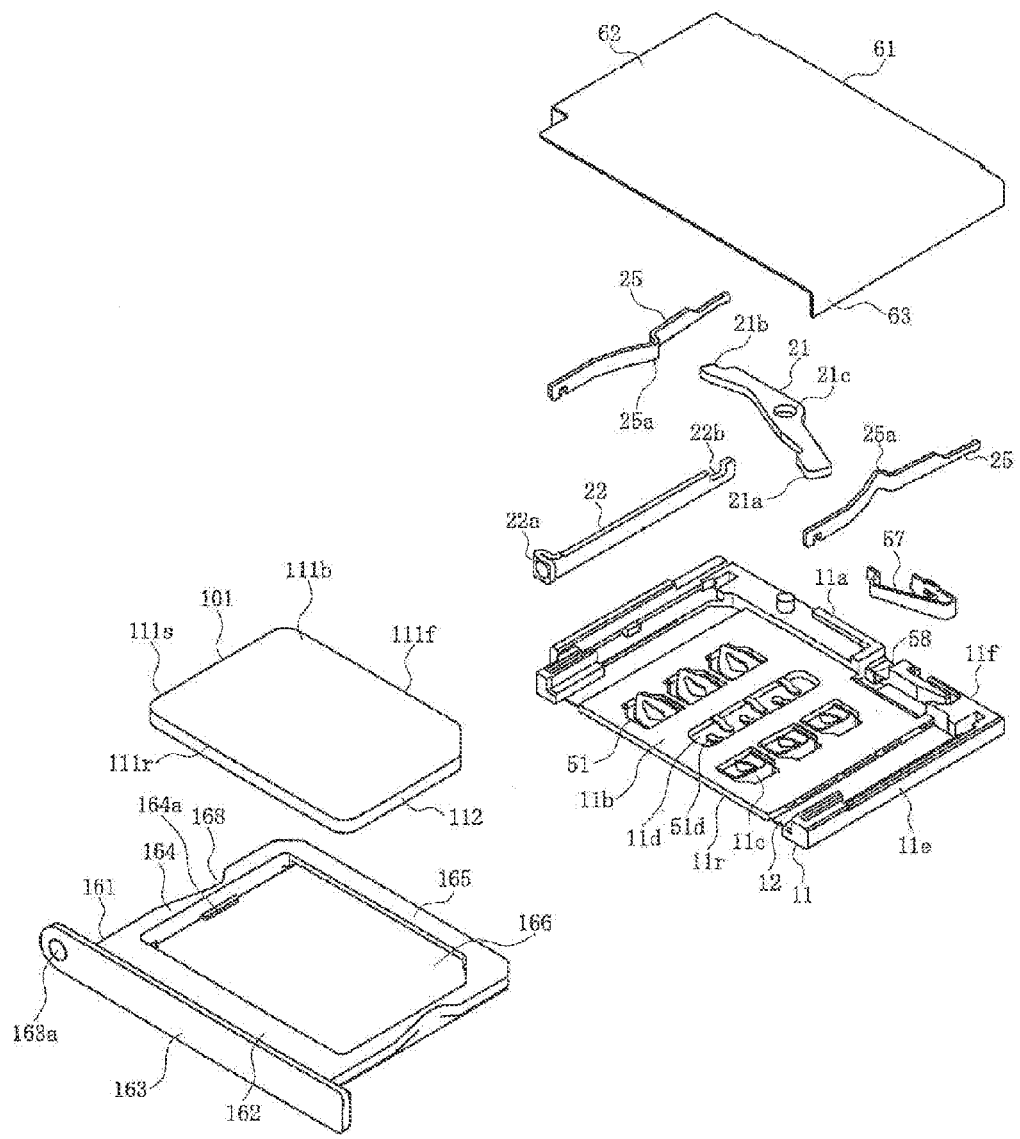
FIG. 3 is an exploded perspective view of the card tray and the card connector in the first embodiment of the present disclosure.
Figure 4:
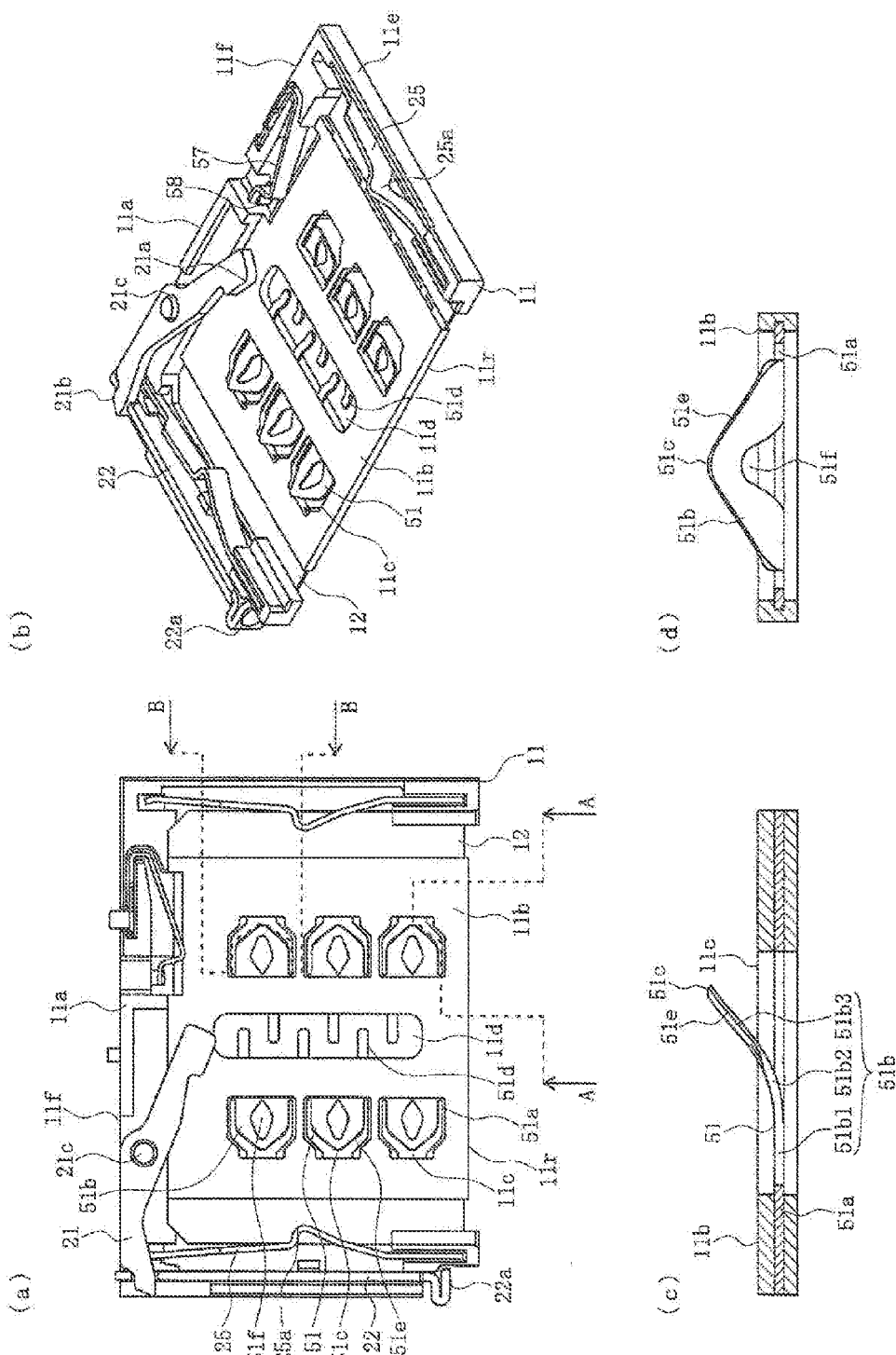
FIG. 4 is a set of drawings showing the card connector in a first embodiment of the present disclosure with the shell removed, in which (a) is a top view, (b) is a perspective view, (c) is an enlarged partial cross-sectional view from A-A in (a), and (d) is an enlarged partial cross-sectional view from B-B in (a).

FIG. 1 is a set of drawings showing a card connector in a first embodiment of the present disclosure including an inserted card tray. FIG. 2 is a set of drawings showing the card connector in the first embodiment of the present disclosure. FIG. 3 is an exploded perspective view of the card tray and the card connector in the first embodiment of the present disclosure. FIG. 4 is a set of drawings showing the card connector in a first embodiment of the present disclosure with the shell removed. In FIG. 1 and FIG. 2, (a) is a top view, (b) is a side view, (c) is a rear view, and (d) is a perspective view. In FIG. 4, (a) is a top view, (b) is a perspective view, (c) is an enlarged partial cross-sectional view from A-A in (a), and (d) is an enlarged partial cross-sectional view from B-B in (a).

In the drawings, 102 is the card module inserted into a card connector 1 mounted on a board inside an electronic device (not shown). In other words, the card module 102 is mounted in the electronic device via the card connector 1. The electronic device may be any type of device, including a personal computer, a mobile phone, a smartphone, a communication modem, a tablet, a digital camera, a video camera, a music player, a gaming console, or a car navigation system.

The card module 102 can be any type of memory card such as a SIM card, a microSIM card, MMC® card, SD® card, miniSD® card, xD-Picture® card, Memory Stick®, Memory Stick Duo®, Smart Media®, or Trans-Flash® memory card. The card module may also be a card adapter having a shape and dimensions suitable for insertion into a card connector 1 in order to house a memory card, such as an SD® card adapter for housing a miniSD® card. In addition, the card module may be a card tray having a shape and dimensions suitable for insertion into the card connector 1 in order to house a memory card. In summary, the card module 102 may be any type of module that can be inserted into the card connector 1 and that can establish an electrical connection with an electronic device via the card connector 1.

For the sake of convenience, the card module 102 in the explanation of the present embodiment is a card tray 161 housing and holding a card 101 as shown in FIG. 3. In the explanation of the present embodiment, the card 101 is a 4th Form Factor (4FF) card or so-called nanoSIM card. In accordance with the ETSI TS 102 221 V 11.00 card standard, the nanoSIM card has a longitudinal length of 12.3 mm, a width of 8.8 mm, and a thickness of 0.67 mm.

In the present embodiment, as shown in the drawings, the card 101 has a substantially rectangular band-like shape defined by a front end 111f and a rear end 111r, and a pair of left and right side ends 111s connecting both ends of the front end 111f and both ends of the rear end 111r. Electrode pads serving as the terminal members (not shown) are arranged in two rows of three along the left and right side ends 111s on the surface. In other words, the two rows of electrode pads extend in the longitudinal direction of the card 101. Electrode pads are not provided on the rear surface 111b.

In the present embodiment, the expressions indicating direction, such as upper, lower, left, right, front and rear, which are used to explain the configuration and operation of each portion of the card connector 1, card module 102, card tray 161, and card 101 are relative and not absolute. They depend on the orientation of the card connector 1, card module 102, card tray 161, and card 101, and their constituent components shown in the drawings. When the orientation of the card connector 1, card module 102, card tray 161, and card 101 or their constituent components change, the interpretation changes in response to the change in orientation.

The card tray 161 is a substantially plate-like member including a metal member integrally formed by stamping and bending a metal plate, and resin portion made of an insulating resin covering and becoming integrated with a portion of the metal portion using a molding technique such as insert molding or overmolding. However, the card tray may also be made exclusively of metal or exclusively of resin.

The card tray 161 has a front frame portion 165 and rear frame portion 162 extending in the transverse direction and defining the front and rear of the card accommodating recessed portions 166, and a pair of side frame portions 164 extending in the longitudinal direction, connecting both ends of the rear frame portion 162 and the front frame portion 165, and defining the front and rear of the card accommodating recessed portions 166. A rear panel portion 163 is integrally formed in the rear surface of the rear frame portion 162. Also, a through-hole 163a is formed in one end of the rear panel portion 163 and passes through the rear panel portion 163 in the thickness direction. The through-hole 163a is a hole through which an auxiliary member such as a pin or rod is passed to apply pressure to and operate the operating portion 22a of the push rod 22 for the card connector 1 as explained below. A holding protrusion 168 is formed in the outer surface of each side frame portion 164 to hold and secure the card tray 161 inserted into the card connector 1.

The card accommodating recessed portion 166 is a substantially rectangular space in plan view which passes through the card tray 161 from top to bottom. When a card 101 is housed inside the card accommodating recessed portion 166, the side surfaces 112 face the inner surfaces of the front frame portion 165, the rear frame portion 162, and the side frame portions 164, and the surface including the electrode pads is exposed on the lower surface of the card tray 161. Eaves portions 164 are formed at any number of locations on the inner surfaces of the front frame portion 165, the rear frame portion 162, and the side frame portions 164 in order to support the surface of the card 101 accommodated inside the card accommodating recessed portion 166.

In front view, the left and right side frame portions 164 protrude on both ends of the front frame portion 165 downward from the front frame portion 165. In other words, the card tray 161 when viewed from the front has a profile shaped like a downward-facing bracket. The lower surface of the front frame portion 165 is preferably positioned above the surface (lower surface) of the card 101 housed inside and held by the card accommodating recessed portion 166. In this way, when the card tray 161 is inserted into the card connector 1, the front frame portion 165 is kept from coming into contact with the terminals 51.

The card connector 1 has a housing 11 integrally molded from an insulating material such as a synthetic resin, and a shell 61 or cover member formed integrally by punching and bending a conductive metal sheet which is attached to the upper side of the housing 11. The shell 61 has a substantially rectangular ceiling panel portion 62 and side panel portions 63 erected on the side edges of the ceiling panel portion 62, and covers the housing 11 and at least some of the upper portion of the card tray 161 inserted into the housing 11 and the card connector 1. The card connector 1 has a substantially parallelepiped shape, and is mounted on the surface of a board such as a printed circuit board in the electronic device. A card tray 161 is inserted into the insertion slot 18 in the rear (below in FIG. 2(a)). More specifically, the card tray 161 is inserted into the card insertion space between the housing 11 and the shell 61.

The housing 11 includes a plurality of lower terminals 51 and a lower shell 12 integrally formed by stamping and bending a metal plate. This substantially plate-like member is integrally molded using a molding technique such as insert molding or overmolding with an insulating resin which covers and becomes integrated with at least a portion of the lower terminals 51 and lower shell 12. The lower shell 12 is a frame member reinforcing the lower housing 11, and is formed from the same member as the lower terminals 51. However, this is separated and electrically insulated from the lower terminals 51.

The housing 11 also includes a bottom wall portion 11b serving as the substantially rectangular, plate-like terminal holding portion, an inner wall portion 11a thicker than the bottom wall portion 11b which extends in the transverse direction of the housing 11 along the front end portion 11f in the insertion direction (longitudinal direction) of the card tray 161, and a pair of side wall portions 11e thicker than the bottom wall portion 11b extending in the insertion direction of the housing 11 along both side edges. The lower surfaces of the inner wall portion 11a and the side wall portions 11e are flush with the lower surface of the bottom wall portion 11b, and the upper surfaces are above the upper surface of the bottom wall portion 11b. The end portion of the housing 11 in the insertion direction of the card tray 161 is referred to as the rear end portion 11r.

Here, the lower wall portion 11b includes a terminal holding recessed portions 11c for holding terminals 51 and a solder tail opening 11d. The terminal holding recessed portions 11c and the solder tail opening 11d are openings which pass through the bottom wall portion 11b in the thickness direction. There is a single solder tail opening 11b, and all of the tail portions 51d, which are the soldered portions of the terminals 51, are exposed in the opening. The tail portions 51d are soldered to connecting pads (not shown) connected to conductive traces in the board in order to establish a reliable electrical connection. The terminal holding recessed portions 11c are formed side by side in rows extending in the longitudinal direction of the housing 11. In the examples shown in the drawing, there are two rows of three. In other words, the terminal holding recessed portions 11c and the terminal 51 in each one of the terminal recessed portions 11c are arranged in two rows extending in the longitudinal direction of the housing 11.

At least some of the base portion 51a of each terminal 51 is embedded in the bottom wall portion 11b, a tail portion 51d is exposed inside a solder tail opening 11d, and the rest is exposed inside the terminal holding recessed portions 11c. In each terminal 51, the base end of an arm portion 51b is connected to the base portion 51a. The arm portion itself is elastically deformable, has a constant thickness, and functions as a cantilever. When external force is not being applied in the initial state, the arm portion 51b has the shape shown in FIG. 4. More specifically, as shown in FIG. 4(c), the arm portion 51b has a plate-like flat panel portion 51b1 formed on the same plane as the base portion 51a and extending parallel to the upper surface of the bottom wall portion 11b, a curved portion 51b2 connected to the leading end of the flat panel portion 51b1 and shaped so as to have a curved surface with a centerline of curvature positioned upwards in side view, and a forward portion 51b3 connected to the leading end of the curved portion 51b2 and positioned above the upper surface of the bottom wall portion 11b. The forward portion 51b3 may have a linear shape or may have a section with the same curved shape as the curved portion 51b2. In the initial state, the arm portion 51b has a shape in side view which does not include an inflection point but is connected linearly to the base portion 51a.

As shown in FIG. 4(a), the arm portion 51b has a pentagonal shape similar to home plate in baseball when viewed from above, and the apex portion 51c positioned at the apex faces the left and right side wall portions 11e. Each terminal 51 is arranged so as to be transverse with respect to the insertion direction of the card 101 or card tray 161, and each arm portion 51b extends from the base portion 51a in the transverse direction of the housing 11. An oblique portion 51e is formed on both sides of the apex portion 51c positioned on the leading end (free end) of each arm portion 51b. The oblique portions are sloped symmetrically with respect to the centerline of the arm portion 51b passing through the apex portion 51c. The oblique portions 51e exist in at least the full range of the forward portion 51b3. A portion does not have to extend to the curved portion 51b2. In plan view, the apex portion 51c preferably comes to a point. However, it preferably has a rounded point.

An opening 51f is formed in the center of the arm portion 51b which passes through the arm portion 51b in the thickness direction. In plan view, the opening 51f has a diamond shape extending from near the leading end of the arm portion 51b to near the base portion, and the long axis of the diamond extends in the direction of extension for the arm portion 51b. More specifically, the opening 51f has a symmetrical shape with respect to the centerline of the arm portion 51b, and the width dimension of the section of the arm portion 51b excluding the opening 51f (the dimension orthogonal to the centerline) becomes gradually larger linearly from the leading end to the base of the arm portion 51b. The arm portion 51b, which has a constant thickness and functions as a cantilever, has the shape of an isosceles triangle in plan view. In other words, it resembles a beam of even strength with uniform bending stress in the longitudinal direction along the centerline.

The apex portion 51c functions as the contact portion of the terminal 51 and is biased upwards by the spring action of the arm portion 51b so as to make contact with the corresponding electrode pad on the card 101 inside the card tray 161 inserted into the card connector 1. The number and arrangement of terminals 51 can be changed to conform to the number and arrangement of electrode pads on the card 101.

A lower shell 12 is exposed between the bottom wall portion 11b and the left and right side wall portions 11e. A holding spring member 25 is arranged on the inside of each side wall portion 11e to hold and secure the card tray 161. Each holding spring member 25 is a slender band-shaped spring member extending in the longitudinal direction, and a holding protrusion 25a is formed near the center which protrudes inwardly in the transverse direction of the housing 11. Each holding protrusion 25a engages a holding recessed portion 168 on the card tray 161 and this holds and secures the card tray 161 inserted into the card connector 1.

A push rod 22 is slidably mounted in the longitudinal direction on the inside surface of one of the side wall portions 11e. This serves as the tray ejection operation member in the tray ejection mechanism for ejecting the card tray 161 inserted into the card connector 1. The push rod 22 is a linear rod-shaped or band-shaped member, and a bent operating portion 22a is integrally connected to the rear end portion. An engaging portion 22b is formed in the front end portion of the push rod 22 to engage the force input portion 21b of the ejection lever 21. The ejection lever 21 is a lever-shaped member arranged near the inner wall portion 11a, and functions as the tray ejection lever of the tray ejection mechanism. As a result, the ejection lever 21 is pivotally mounted on the bottom wall portion 11b at the fulcrum portion 21c. The end on the other side of the fulcrum portion 21c from the force input portion 21b functions as the force output portion 21a which comes into contact with the front frame portion 165 of the card tray 161 inserted into the card connector 1 and applies force to the card tray 161 in the direction of ejection.

The housing 11 includes a movable member 57 and a fixed member 58 for the detection switch used to detect if a card tray 161 inserted into the card connector 1 has reached a predetermined position (the position where the card tray 161 is held by the holding spring member 25 and where the apex portion 51c of each terminal 51 makes contact with the corresponding electrode pad on the card 101 when a card 101 is housed inside the card tray 161). Because the movable member 57 and the fixed member 58 make contact when the card tray 161 has not reached the predetermined position, the detection switch is electrified or turned ON. However, when the card tray 161 reaches the predetermined position, the movable member 57 makes contact with and presses against the front frame portion 165 of the card tray 161, and this displaces and separates the movable member 57 from the fixed member 58. Because the detection switch is no longer electrified and turned OFF, the presence of the card tray 161 at the predetermined position is detected.

The following is an explanation of the operations performed by a card connector 1 with this configuration. First, the operations performed to insert the card tray 161 will be explained.

Figure 5:
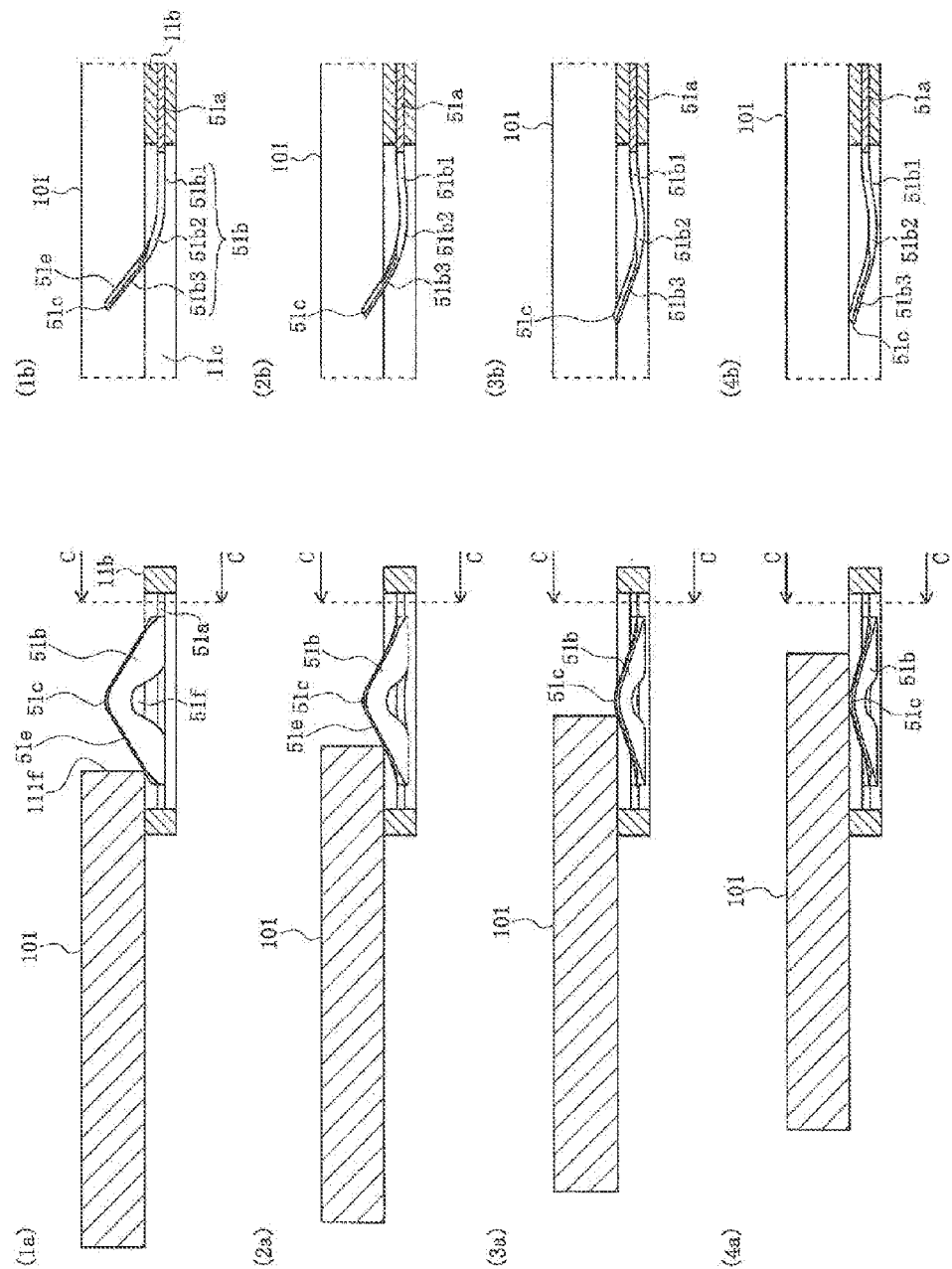
FIG. 5 is a set of drawings used to explain the changes in the contact between the card and the terminals in the card connector of the first embodiment of the present disclosure, in which (1a) through (4a) are lateral cross-sectional views at each step, and (1b) through (4b) are enlarged partial cross-sectional views from C-C in (1a) through (4a).

FIG. 5 is a set of drawings used to explain the changes in the contact between the card and the terminals in the card connector of the first embodiment of the present disclosure. Here, (1a) through (4a) are lateral cross-sectional views at each step, and (1b) through (4b) are enlarged partial cross-sectional views from C-C in (1a) through (4a).

The user manually inserts a card tray 161 containing a card 101 serving as the card module 102 into the card connector 1 via the insertion slot 18. Here, the card tray 161 is inserted properly with the upper surface facing upwards towards the ceiling panel portion 62 of the shell 61, the lower surface facing downwards towards the bottom wall portion 11b of the housing 11, and the front frame portion 165 facing the front end portion 11f of the housing 11. The card 101 housed inside the card accommodating recessed portion 166 is also arranged properly with the rear surface 111b facing upwards and the surface with the electrode pads facing downwards and exposed on the lower surface of the card tray 161. The card tray 161 can be inserted into and ejected from the card connector 1 whether it is housing a card 101 or not housing a card 101. In the following explanation, it houses a card 101.

When the user inserts the card tray 161 further into the insertion slot 18, the card tray 161 moves through the card insertion space formed between the shell 61 and the housing 11 towards the front end portion 11f and reaches a predetermined position. At this time, more specifically, each terminal 51 comes into contact with the card 101 and, as shown in FIG. 5, are gradually displaced. In FIG. 5, for the sake of convenience in this explanation, the card tray 161 has been omitted and only the card 101 is depicted. In FIG. 5(1a) through (4a), the insertion direction for the card 101 is to the right.

First, as shown in FIG. 5(1a) and (1b), the lower end of the front end 111f of the card 101 comes into contact with one oblique portion 51e in the arm portion 51b of the terminal 51 (the rear end portion 11r side). As explained above, the forward portion 51b3 of the arm portion 51b is positioned above the upper surface of the bottom wall portion 11b and the oblique portions 51e are present in the entire range of the forward portion 51b3. As a result, the lower end of the front end 111f of the card 101 inserted with the bottom surface running along the upper surface of the bottom wall portion 11b always makes contact with the oblique portion 51e on the rear end portion 11r side.

Next, when the card 101 moves towards the front end portion 11f, the lower end of the front end 111f of the card 101 moves while maintaining contact with the oblique portion 51e on the rear end portion 11r side. In other words, it slides over the oblique portion 51e. As shown in FIGS. 5(2a) and (2b), the front portion 51b3 in the arm portion 51b is pressed down and even more elastically displaced.

Next, when the card 101 moves even further towards the front end portion 11f, the lower end of the front end 111f of the card 101 slides further along the oblique portion 51e on the rear end portion 11r side. As shown in FIGS. 5(3a) and (3b), the front portion 51b3 in the arm portion 51b is pressed down and even more elastically displaced.

Next, when the card 101 moves even further towards the front end portion 11f, as shown in FIGS. 5(4a) and (4b), the lower end of the front end 111f of the card 101 passes the apex portion 51c and the apex portion 51c slides along the downward-facing surface of the card 101. The front portion 51b3 of the arm portion 51b is no longer displaced downward. As shown in FIGS. 5(4a) and (4b), even when the front portion 51b3 is displaced downwardly by the inserted card 101, the arm portion 51b is positioned above the lower surface of the bottom wall portion 11b and does not protrude below the lower surface. Therefore, even when the lower surface makes contact with the upper surface of the board, the arm portion 51b does not make contact with the conductive traces exposed on the surface of the board and no short-circuiting occurs.

Finally, when the card tray 161 reaches the predetermined position, the holding protrusions 25a on the pair of left and right holding spring members 25 engage the holding recessed portions 168 on the card tray 161. In this way, as shown in FIG. 1, the card tray 161 is held stably and locked at the position corresponding to the predetermined position and cannot be displaced to the rear. When the card tray 161 reaches the position corresponding to the predetermined position, the force output portion 21a of the ejection lever 21 is pressed by the front frame portion 165 and interferes with the inner wall portion 11a of the housing 11. As a result, the card tray 161 cannot move forward any further.

When the card tray 161 reaches the predetermined position, the movable member 57 of the detection switch moves away from the fixed member 58. Because this turns OFF the detection switch, the presence of the card tray 161 at the predetermined position is detected.

The following is an explanation of the operations performed to eject the card tray 161 from the card connector 1.

First, the user manually operates an auxiliary member such as a pin or rod, the auxiliary member is passed from the rear of the card tray 161 into a through-hole 163a formed in the rear panel portion 163, and the leading end of the auxiliary member is brought into contact with the operating portion 22a of the push rod 22. When the user manually pushes in the push rod 22 using the auxiliary member, the force input portion 21b of the ejection lever 21 engaging the engaging portion 22b of the push rod 22 is displaced. As a result, the force output portion 21a of the ejection lever 21 pushes against the front frame portion 165, and the card tray 161 is displaced from the predetermined position towards the rear. Because the holding protrusions 25a of the holding spring member 25 and the holding recessed portions 168 of the card tray 161 become disengaged and unlocked, the push rod 22 is resisted via the card tray 161 and the ejection lever 21 primarily by the spring action of the holding spring members 25. However, this resistance is not as great as the pressing action of the user's finger, and the rod continues to move forward against the resistance. The detection switch is turned ON, and the retreat of the card tray 161 from the predetermined position is detected.

At this time, the rear panel portion 163 of the card tray 161 protrudes sufficiently from the insertion slot 18 in the card connector 1. As a result, the user is able to manually grasp the rear panel portion 163 and remove the card tray 161 from the card connector 1.

The following is an explanation of a situation in which a card tray 161 housing a card 101 serving as the card module 102 is inserted into the card connector 1 in a skewed orientation.

Figure 6:
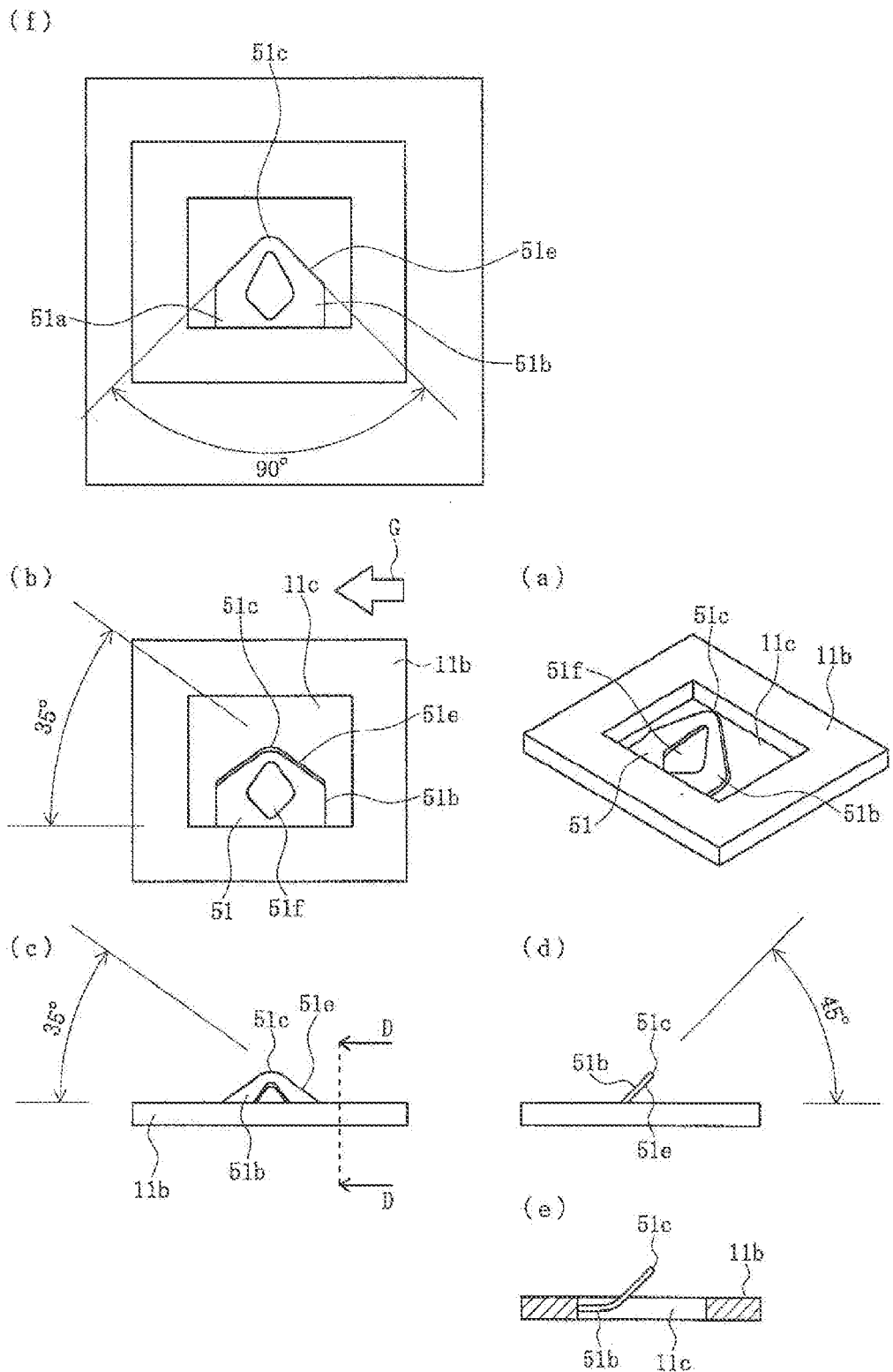
FIG. 6 is a set of drawings showing a specific example of a terminal on the card connector in the first embodiment of the present disclosure, in which (a) is a perspective view of the arm portion of the terminal, (b) is a top view of the arm portion of the terminal, (c) is a side view of the arm portion of the terminal, (d) is a rear view of the arm portion of the terminal, (e) is a cross-sectional view from D-D in (c), and (f) is a top view of the arm portion of the terminal deformed into a flat plate.
Figure 7:
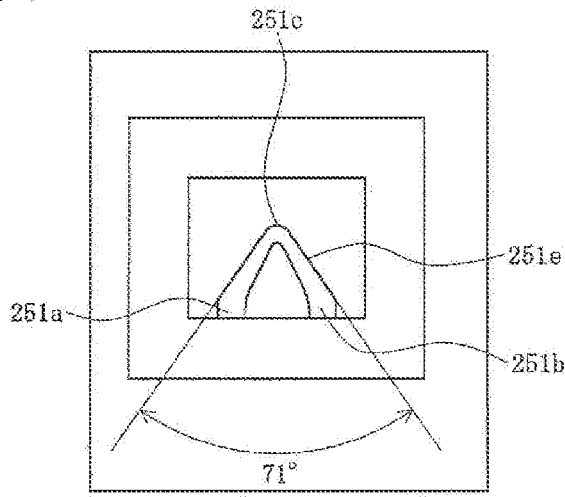
FIG. 7 is a set of drawings showing specific examples of a terminal on the card connector in a comparative example, in which (a) is a perspective view of the arm portion of the terminal, (b) is a top view of the arm portion of the terminal, (c) is a side view of the arm portion of the terminal, (d) is a rear view of the arm portion of the terminal, (e) is a cross-sectional view from D-D in (c), and (f) is a top view of the arm portion of the terminal deformed into a flat plate.
Figure 7:
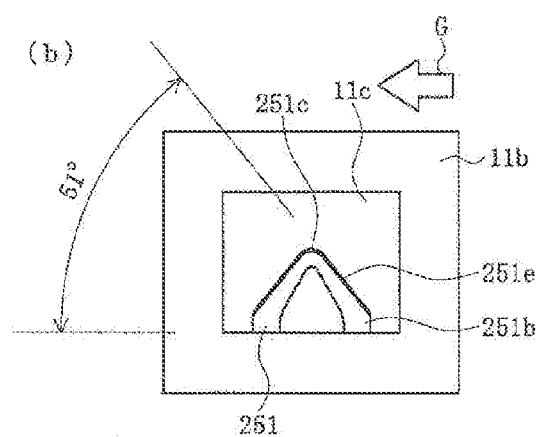
Figure 7:
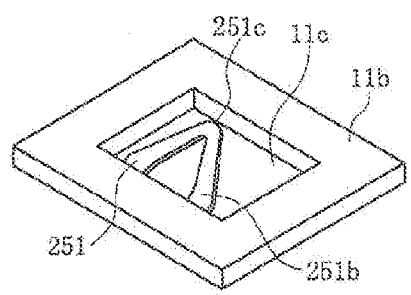
Figure 7:
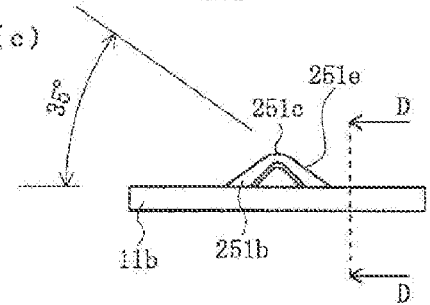
Figure 7:
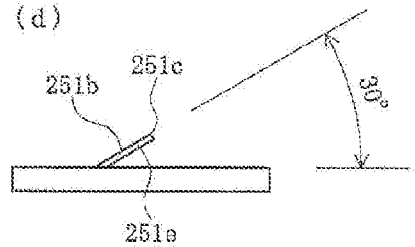
Figure 7:
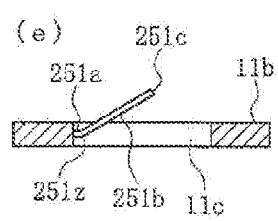
Figure 8:
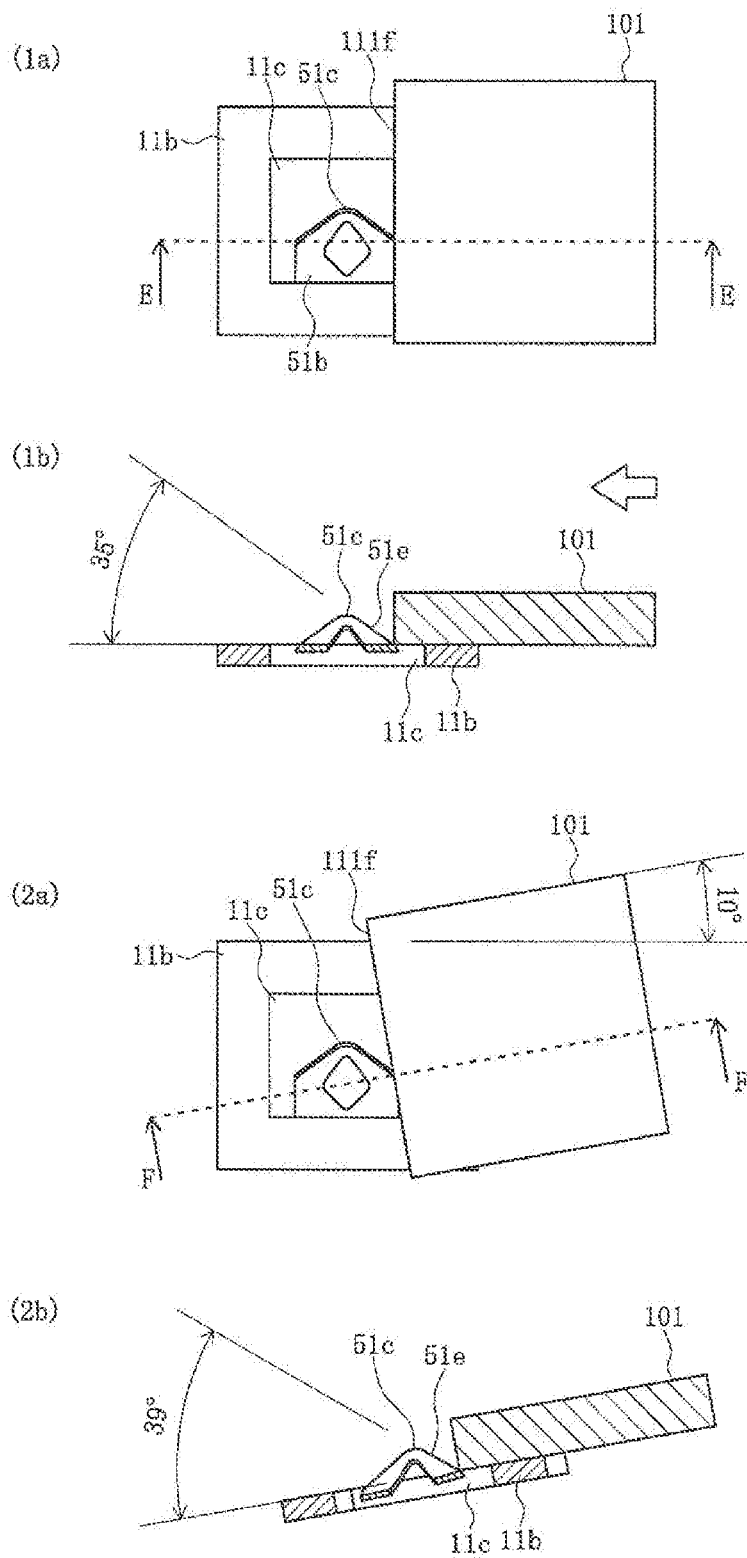
FIG. 8 is a set of drawings showing contact between a card and the specific example of a terminal for a card connector in the first embodiment of the present disclosure, in which (1a) is a top view showing contact with the apex portion of the terminal when the card is not inclined, (1b) is a cross-sectional view from E-E in (1a), (2a) is a top view showing contact with the apex portion of the terminal when the card is inclined, and (2b) is a cross-sectional view from F-F in (2a).
Figure 9:
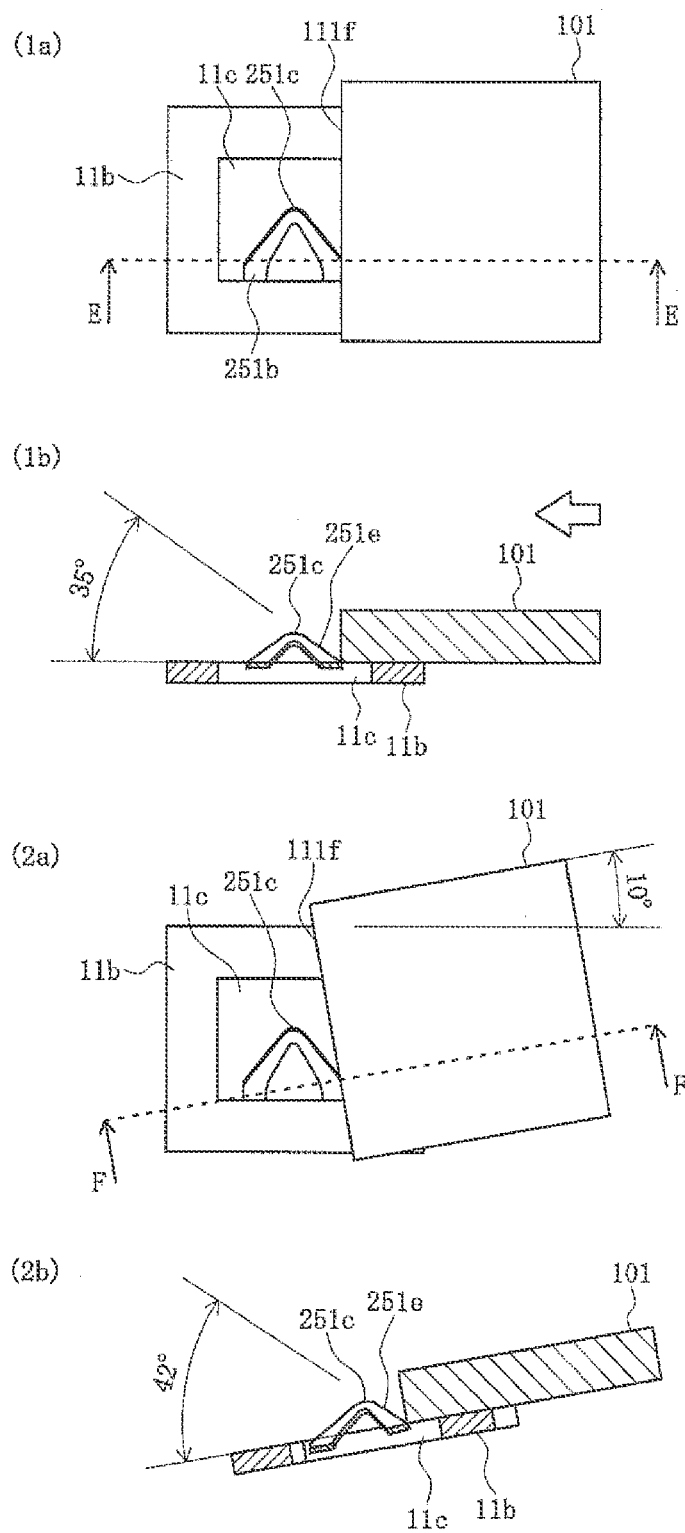
FIG. 9 is a set of drawings showing contact between a card and the terminal for a card connector in the comparative example, in which (1a) is a top view showing contact with the apex portion of the terminal when the card is not inclined, (1b) is a cross-sectional view from E-E in (1a), (2a) is a top view showing contact with the apex portion of the terminal when the card is inclined, and (2b) is a cross-sectional view from F-F in (2a).

FIG. 6 is a set of drawings showing a specific example of a terminal on the card connector in the first embodiment of the present disclosure, FIG. 7 is a set of drawings showing specific examples of a terminal on the card connector in a comparative example, FIG. 8 is a set of drawings showing contact between a card and the specific example of a terminal for a card connector in the first embodiment of the present disclosure, and FIG. 9 is a set of drawings showing contact between a card and the terminal for a card connector in the comparative example. In FIG. 6 and FIG. 7, (a) is a perspective view of the arm portion of the terminal, (b) is a top view of the arm portion of the terminal, (c) is a side view of the arm portion of the terminal, (d) is a rear view of the arm portion of the terminal, (e) is a cross-sectional view from D-D in (c), and (f) is a top view of the arm portion of the terminal deformed into a flat plate. In FIG. 8 and FIG. 9, (1a) is a top view showing contact with the apex portion of the terminal when the card is not inclined, (1b) is a cross-sectional view from E-E in (1a), (2a) is a top view showing contact with the apex portion of the terminal when the card is inclined, and (2b) is a cross-sectional view from F-F in (2a).

Here, the specific example of a terminal shown in FIG. 6 and the comparative example shown in FIG. 7 are compared to explain the performance of the terminal 51 in the present embodiment. The specific example is an example of the terminal 51 in the present embodiment, but the terminal 51 in the present embodiment is not limited to this specific example.

In the plan view of the terminal 51 in the present embodiment, the size of the angle of inclination of the oblique portions 51e relative to the direction orthogonal to the centerline of the arm portion 51b (the insertion direction of the card tray 161 and the card 101 indicated by arrow G) is preferably 35 degrees or more. However, it is 35 degrees in the specific example shown in FIG. 6(b). When the terminal 51 is viewed from behind along the centerline of the arm portion 51b, the size of the angle of inclination of the oblique portions 51e relative to the upper surface of the bottom wall portion 11b is preferably 35 degrees or more. However, it is 35 degrees in the specific example shown in FIG. 6(c). The angle of inclination corresponds to the initial angle of inclination of the oblique portions 51e when the front end portion 111f of the card 101 explained in FIG. 5 slides along the angle of inclination 51e.

When the terminal 51 is viewed from the insertion direction indicated by arrow G, the size of the angle of inclination of the oblique portions 51e near the apex portion 51c relative to the upper surface of the bottom wall portion 11b is preferably 45 degrees or more. However, it is 45 degrees in the specific example as shown in FIG. 6(d). When the curved arm portion 51b is deformed to make a flat plate on the same plane as the base portion 51a, the size of the apex angle of the apex portion 51c (the angle formed by the pair of oblique portions 51e) in plan view is preferably 90 degrees or more. However, it is 90 degrees in the specific example as shown in FIG. 6(f).

By contrast, in the plan view of the terminal 251 of the comparative example, the size of the angle of inclination of the oblique portions 251e relative to the arm portion 251b in the insertion direction indicated by arrow G is 51 degrees as shown in FIG. 7(b). When the terminal 251 is viewed from behind along the centerline of the arm portion 251b, the size of the angle of inclination of the oblique portions 251e relative to the upper surface of the bottom wall portion 11b is 35 degrees as shown in FIG. 7(c). When the terminal 251 is viewed from the insertion direction indicated by arrow G, the size of the angle of inclination of the oblique portions 251e near the apex portion 251c relative to the upper surface of the bottom wall portion 11b is 30 degrees as shown in FIG. 7(d). When the curved arm portion 251b is deformed to make a flat plate on the same plane as the base portion 251a, the size of the apex angle of the apex portion 251c (the angle formed by the pair of oblique portions 251e) in plan view is 71 degrees as shown in FIG. 7(f).

In other words, the terminal 51 of the present embodiment, when viewed from the insertion direction as shown in FIG. 6(d), has a larger angle of inclination of the oblique portions 51e relative to the upper surface of the bottom wall portion 11b. However, as shown in FIG. 6(b) and FIG. 6(f), by reducing the angle of inclination of the oblique portions 51e and increasing the apex angle of the apex portion 51c, the angle of inclination of the oblique portions 51e shown in FIG. 6(c), that is, the initial angle of inclination of the oblique portions 51e when the front end portion 11f of the card 101 slides along the angle of inclination 51e, is kept relatively small. By contrast, in the terminal 251 of the comparative example, the angle of inclination of the oblique portions 251e shown in FIG. 7(c), that is, the initial angle of inclination of the oblique portions 251e when the front end portion 11f of the card 101 slides along the angle of inclination 251e, is the same as that of the terminal 51 in the present embodiment but, as shown in FIG. 7(d), when viewed from the insertion direction, the angle of inclination of the oblique portions 251e relative to the upper surface of the bottom wall portion 11b is smaller and, as shown in FIG. 7(b) and FIG. 7(f), the angle of inclination of the oblique portions 251e is smaller than the apex angle of the apex portion 51c.

In the terminal 251 of the comparative example, as shown in FIG. 7(e), the base portion of the arm portion 251b is curved at curved portion 251z and connected to the base portion 251a. When viewed from the side, the arm portion 251b extends linearly towards the leading end. Therefore, in the terminal 251 of the comparative example, the amount by which the apex portion 251c protrudes from the upper surface of the bottom wall portion 11b is substantially equal to the apex portion 51c of the terminal 51. However, the angle of inclination of the arm portion 251b relative to the upper surface of the bottom wall portion 11b in the section where it protrudes from the upper surface of the bottom wall portion 11b, that is, the angle of inclination of the oblique portions 251e near the apex portion 251c as shown in FIG. 7(d), is somewhat smaller than that of the oblique portions 51e of the terminal 51 in the present embodiment. Also, the shape of the arm portion 251b of the terminal 251 in the comparative example when viewed from the side includes a curved portion 251z serving as an inflection point.

When a card tray 161 housing a card 101 is inserted properly into the card connector 1, as shown in FIG. 8(1a), the card 101 comes into contact with each arm portion 51b with the front end 111f parallel to the centerline of the arm portion 51b of the terminal 51. However, dimensional differences in cards 101 and/or card trays 161 and improper operation by the user, as shown in FIG. 8(2a), may cause the front end 111f of the card 101 to come into contact with the arm portions 51b inclined with respect to the centerline of the arm portion 51b of the terminal 51.

Because the angle of inclination of the oblique portions 51e relative to the upper surface of the bottom wall portion 11b is large in the terminal 51 of the present disclosure when viewed from the insertion direction, it is clear in a comparison of FIG. 8(2b) and FIG. 8(1b) the initial angle of inclination of the oblique portions 51e when the front end 111f of the card 101 slides along the oblique portions 51e does not increase very much. Therefore, the resistance does not increase when the card 101 advances with the front end 111f sliding over the oblique portions 51e, the forward portion 51b3 of the arm portion 51b is easily displaced, and the card 101 can easily advance.

By contrast, when the terminal 251 of the comparative example is viewed from the insertion direction, the angle of inclination of the oblique portions 251e relative to the upper surface of the bottom wall portion 11b is small. Therefore, as can be seen when FIG. 9(2b) and FIG. 9(1b) are compared, the initial angle of inclination of the oblique portions 251e gradually increases as the front end 111f of the card 101 slides over the oblique portions 251e. Therefore, the resistance increases when the card 101 advances with the front end 111f sliding over the oblique portions 251e, the forward portion of the arm portion 251b is difficult to displace downwards, and the card 101 cannot easily advance.

In other words, when the terminal 51 in the present embodiment is viewed from the insertion direction, the angle of inclination of the oblique portions 51e relative to the upper surface of the bottom wall portion 11b is large. As a result, even when the card 101 is inserted in a skewed manner, the forward portion 51b3 in the arm portion 51b can be elastically displaced downwards with ease, and the card 101 can easily advance. When viewed from the insertion direction, the angle of inclination of the oblique portions 51e relative to the bottom wall portion 11b is large, but it is not affected by the skewed card 101. It is clear that, if the angle of inclination were close to 90 degrees, the initial angle of inclination of the oblique portions 51e as the front end 111f of the card 101 slides along the oblique portions 51e would be somewhat larger even when the card is skewed. Also, if the angle of inclination were close to 0 degrees, the initial angle of inclination of the oblique portions 51e as the front end 111f of the card 101 slides along the oblique portions 51e the initial angle of inclination of the oblique portions 51e as the front end 111f of the card 101 slides along the oblique portions 51e would be very large even when the card is skewed.

In the terminal 51 of the present embodiment, the distance from the contact point with the front end 111f of the card 101 with the oblique portion 51e to the base end of the arm portion 51b is also longer than that of the terminal 251 in the comparative example. Therefore, the spring length of the arm portion 51b is longer than that of the terminal 251 in the comparative example, the load on the arm portion 51b is reduced, the resistance does not increase when the card 101 advances, and the spring action of the arm portion 51b is more reliable. The distance which the front end 111f of the card 101 slides over the oblique portion 51e is also shorter than that of the terminal 251 in the comparative example, and so is less likely to be damaged by the card 101.

In the present embodiment, the card connector 1 receives an inserted card module 102 with electrode pads on one surface. The card connector 1 has a housing 11 including a bottom wall portion 11b on which terminals 51 are arranged to make contact with the electrode pads of the card module 102, and each terminal 51 includes a base portion 51a held by the bottom wall portion 11b and a cantilevered arm portion 51b protruding transversely relative to the insertion direction of the card module 102 when the terminal 51a is viewed from above. The arm portion 51b has a curved portion 51b2 shaped so as to have a curved surface with the centerline of curvature positioned upwards in side view and a pair of oblique portions 51e inclined relative to the extension direction of the arm portion 51b on both sides of the apex portion 51c positioned on the free end.

Whether the card module 102 is being inserted or ejected, even the protruding portions and corner portions of the card module 102 come into contact with the oblique portions 51e and slide along the oblique portions 51e, and the arm portions 51b do not get caught. Therefore, the card module 102 can be inserted and ejected smoothly, the terminals 51 do not become damaged or plastically deformed, and the card connector 1 is more reliable. The card tray 161 can be inserted while housing a card 101 as the card module 102, or the card tray 161 can be inserted while empty. When an empty card tray 161 is inserted or ejected, there is a possibility that the front frame portion 165 of the card tray 161 will make contact with the arm portions 51b. However, because the front frame portion 165 comes into contact with the oblique portions 51e and slides along the oblique portions 51e, it does not get caught on the arm portions 51b.

The arm portion 51b includes a flat panel portion 51b1 connected to the base portion 51a and extending parallel to the upper surface of the bottom wall portion 11b, an apex portion 51c connected to the leading end of the curved portion 51b2, and a forward portion 51b3 positioned above the upper surface of the bottom wall portion 11b. The shape of the arm portion 51b in side view does not include an inflection point and the spot connected to the base portion 51a is connected linearly to the base portion 51a. Because the apex portion 51c comes into contact with the corresponding electrode pad on the card module 102, when the card module 102 is inserted and ejected, a wiping effect can be anticipated on the surface of the electrode pad by the apex portion 51c, and this cleans the surface of the electrode pad. As a result, the terminal 51 and the electrode pad are more reliably electrified. Because the distance from the position of the card module 102 on the arm portion 51b to the base portion 51a is long, the spring length on the arm portion 51b is lengthened and there is no inflection point. As a result, bending stress does not concentrate at a single point, the spring action of the arm portion 51b can be maintained, contact pressure with the electrode pad can be increased, and the load on the arm portion 51b can be decreased. Even when the card module 102 is inserted askew, the resistance does not increase when the card module 102 moves over the oblique portion 51e, the forward portion 51b3 of the arm portion 51b is displaced downward elastically with ease, and the card module 102 can easily advance.

The oblique portions 51e include a section positioned above the upper surface of the bottom wall portion 11b. However, because the inserted card module 102 reliably comes into contact with the oblique portion 51e, it slides along the oblique portion 51e without getting caught on the arm portion 51b.

The arm portion 51b includes an opening 51f passing through the arm portion 51b in the thickness direction, and the opening 51f has a diamond shape in which one axis is aligned with the extension direction of the arm portion 51b in plan view. The width dimension of the section of the arm portion 51b excluding the opening 51f gradually increases linearly towards the base portion 51a from the free end of the arm portion 51b. In this way, the arm portion 51b can function as a beam of even strength with uniform bending stress in the longitudinal direction along the centerline.

The following is an explanation of a second embodiment of the present disclosure. All structural elements that are identical to those of the first embodiment are denoted by the same reference numerals and further explanation of these elements has been omitted. Further explanation of all operations and effects identical to those of the first embodiment has also been omitted.

Figure 10:
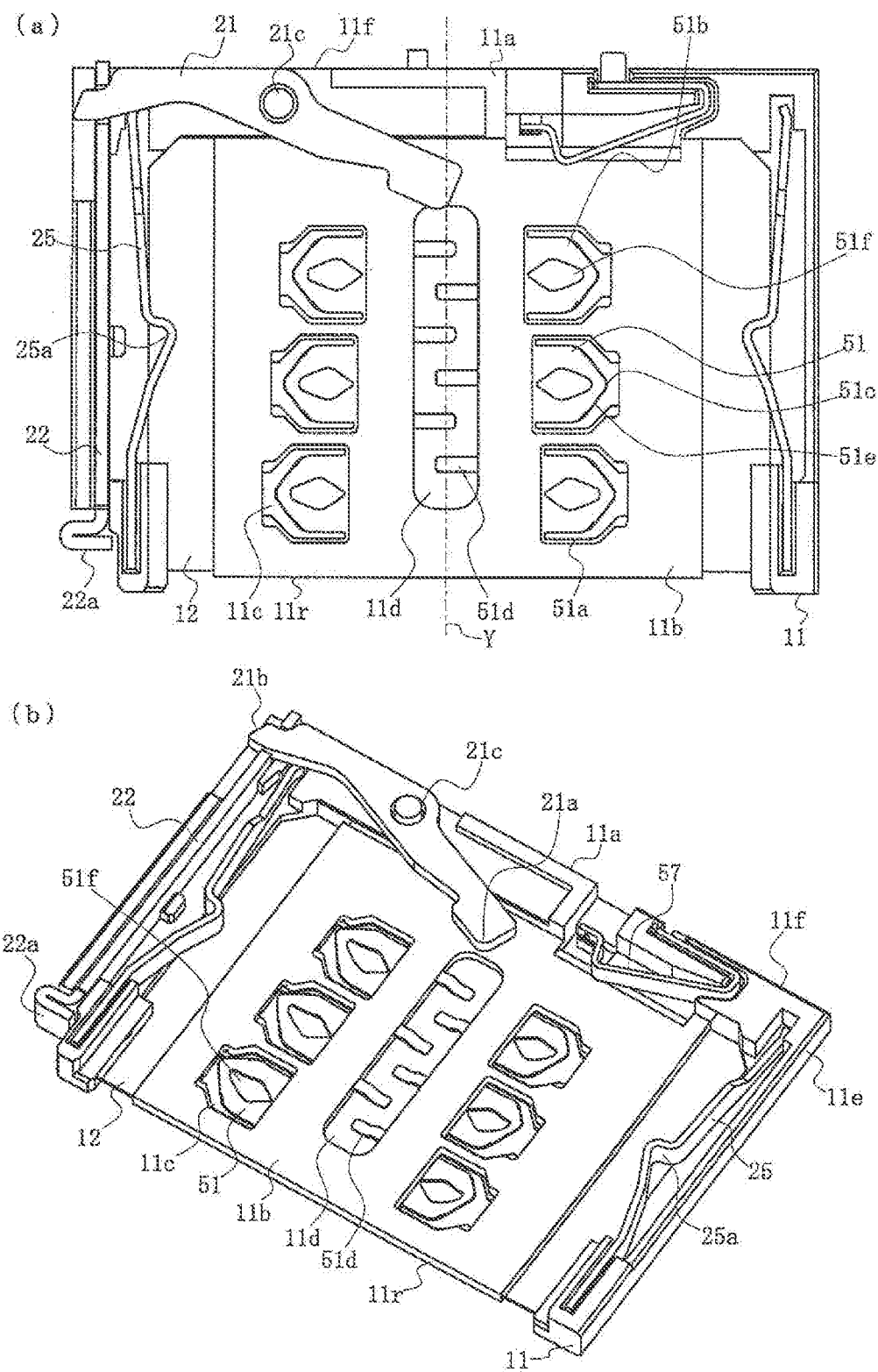
FIG. 10 is a pair of drawings showing a card connector in a second embodiment of the present disclosure with the shell removed, in which (a) is a top view and (b) is a perspective view.

FIG. 10 is a pair of drawings showing a card connector in a second embodiment of the present disclosure with the shell removed. Here, (a) is a top view and (b) is a perspective view.

In the present embodiment, as in the first embodiment, the terminals 51 are arranged in two rows of three, that is, two rows extending in the longitudinal direction of the housing 11 (in the insertion direction of the card module 102). However, each row is arranged so that the terminals 51 have different positions relative to the width direction of the housing 11 (in the transverse direction relative to the insertion direction of the card module 102).

More specifically, as shown in FIG. 10(a), the terminals 51 are arranged so that the distance from the centerline Y of the housing 11 to the apex portions 51c of the terminals 51 is shorter as the terminals 51 approach the front end portion 11f of the housing 11. Stated another way, the terminals 51 are arranged so that the interval between the apex portions 51c of the pairs of left and right terminals 51 becomes wider as the rear end portion 11r of the housing 11 is approached and narrower as the front end 11f of the housing 11 is approached. The centerline Y is a straight line extending in the longitudinal direction of the housing 11 through the center of the housing 11 in the transverse direction, and two rows of terminals 51 are arranged symmetrically to the left and right of the centerline.

Each of the terminals 51 is arranged so that the distance from the centerline Y of the housing 11 to the apex portion 51c of each terminal 51 is longer for the terminals 51 near the front end portion 11f of the housing 11. For example, the distance from the centerline Y of the housing 11 to the apex portion 51c of the terminal 51 can be shorter on the terminal 51 near the front end portion 11f of the housing 11 in the row on the right side, but longer on the terminal 51 near the front end portion 11f of the housing 11 in the row on the left side.

In sum, the arrangement can be such that the positions of the apex portions 51c of the terminals 51 in each row change in respect to the width direction of the housing 11.

In the present embodiment, the terminals 51 are arranged in rows which extend in the insertion direction of the card module 102 and, in these rows, the positions of the apex portions 51c of the terminals 51 is different in the width direction relative to the insertion direction of the card module 102. Because the position at which the apex portion 51c of a terminal 51 comes into contact with an electrode pad on the card module 102 is different for each terminal 51 in both rows, when the card module 102 is inserted and ejected, the apex portion 51c of each terminal 51 does not slide over the same spots on the electrode pads, and the same spots on the electrode pads do not experience wear.

The other configurational elements, operations, and effects are the same as those of the first embodiment, so further explanation of these has been omitted.

The following is an explanation of a third embodiment of the present disclosure. All structural elements that are identical to those of the first and second embodiments are denoted by the same reference numerals and further explanation of these elements has been omitted. Further explanation of all operations and effects identical to those of the first and second embodiments has also been omitted.

Figure 11:
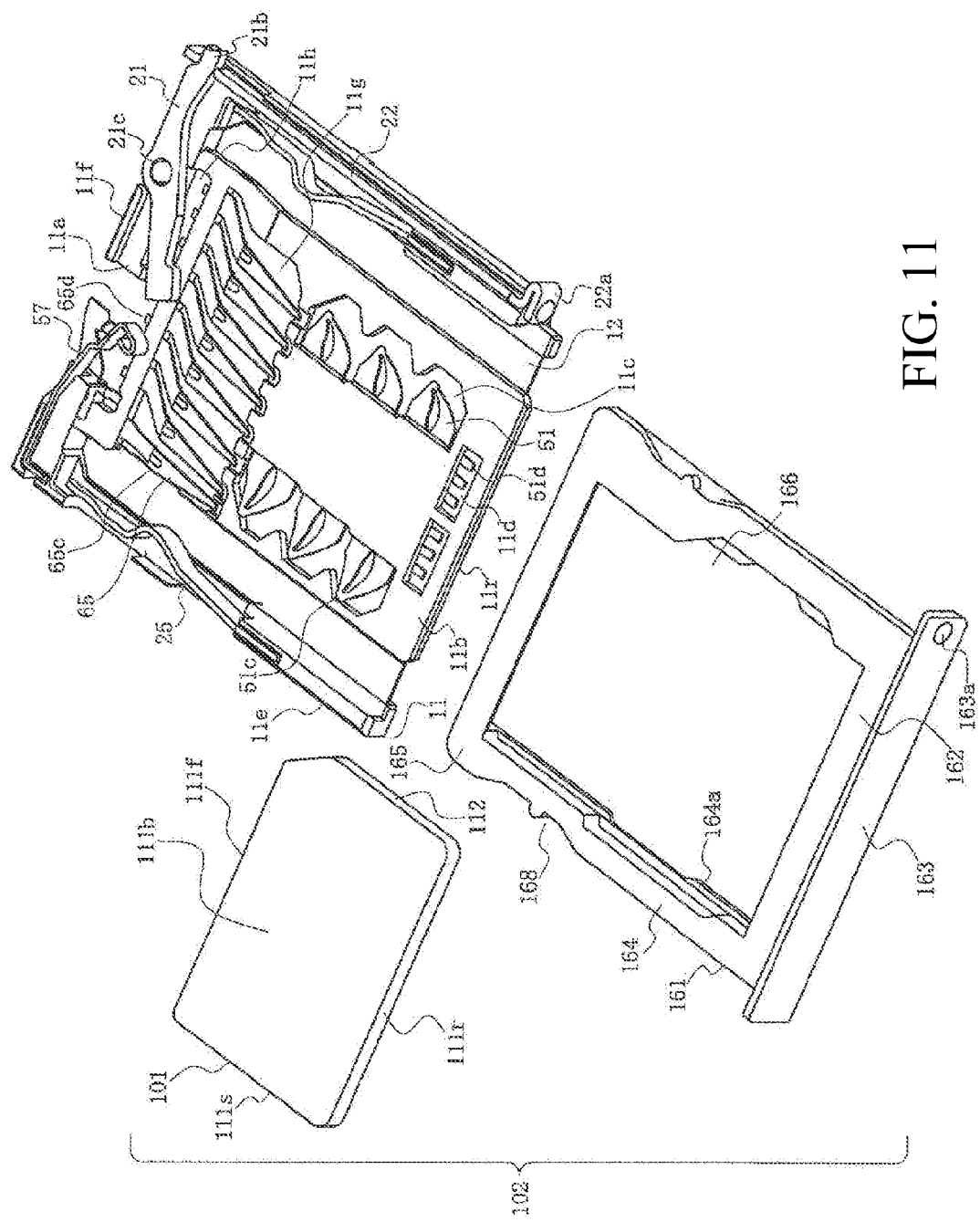
FIG. 11 is a perspective view showing a card tray and a card connector with the shell removed in a third embodiment of the present disclosure.
Figure 12:
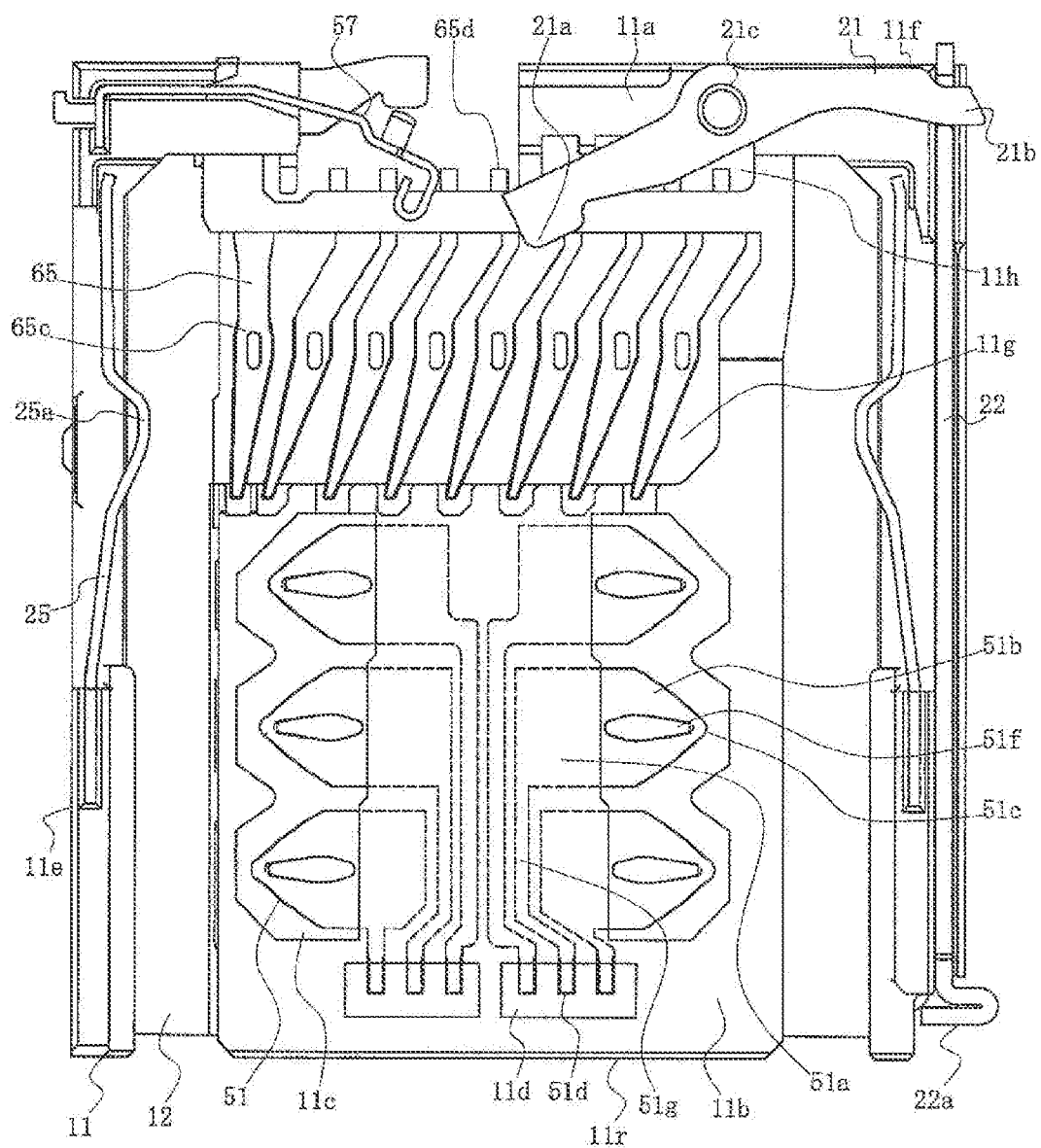
FIG. 12 is a top view showing the card connector with the shell removed in the third embodiment of the present disclosure.
Figure 13:
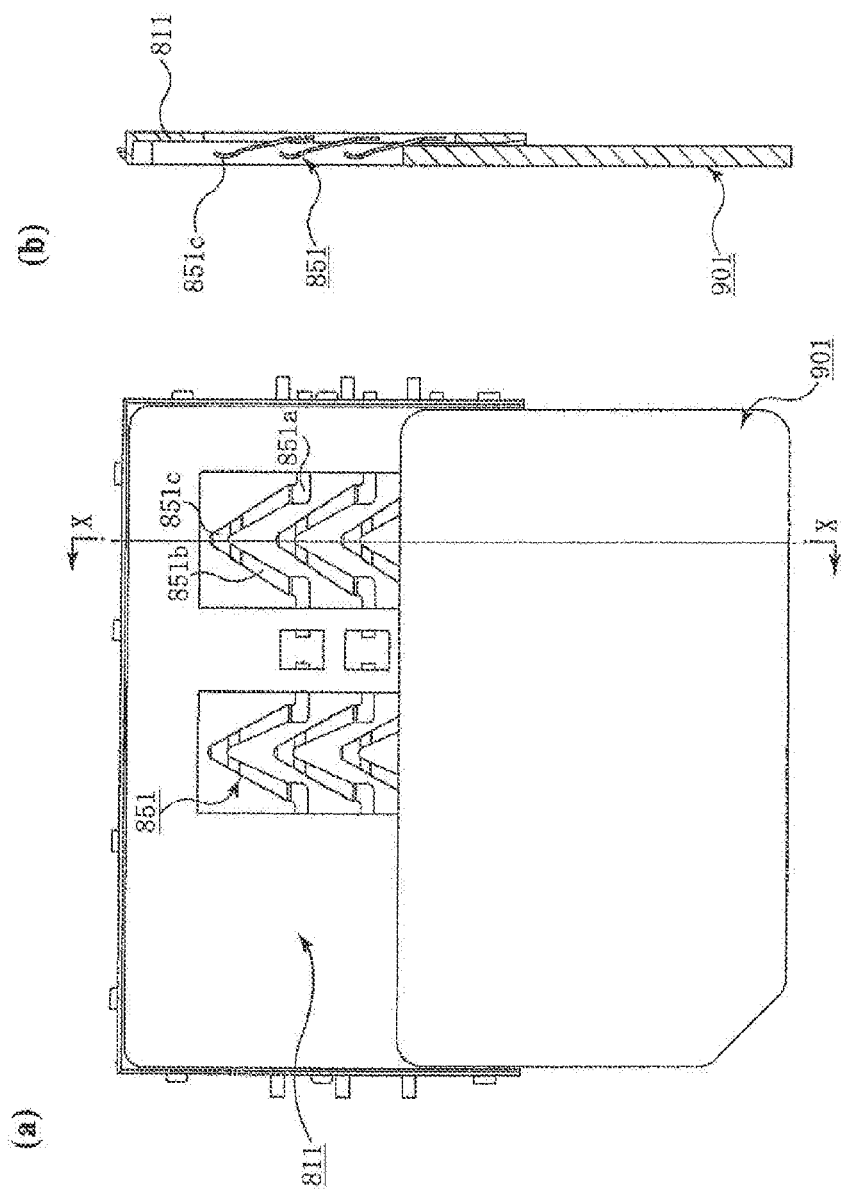
FIG. 13 is a pair of drawings showing a card connector of the prior art. Here, (a) is a plan view and (b) is a cross-sectional view from X-X in (a).

FIG. 11 is a perspective view showing a card tray and a card connector with the shell removed in a third embodiment of the present disclosure, and FIG. 12 is a top view showing the card connector with the shell removed in the third embodiment of the present disclosure.

Two types of card, for example, a microSD card or a nanoSIM card, can be selectively used in the present embodiment. The SD Card Association, which is the standard setting body for SD® cards, has set the size of microSD® cards at 15 mm×11 mm×1.0 mm (L×W×D).

Therefore, as shown in FIG. 11, the card module 102 in the present disclosure has a somewhat different shape and longitudinal dimension than the card module 102 in the first embodiment shown in FIG. 3 and can selectively accommodate either a microSD® card or a nanoSIM card. In all other respects, it is identical to the card module 102 in the first embodiment. For the sake of convenience, the card 101 in the following explanation is a nanoSIM card 101.

As shown in FIG. 11 and FIG. 12, the housing 11 in the present embodiment includes secondary terminals 65 in addition to the terminals 51. As in the case of the terminals 51 and the lower shell 12, the secondary terminals 65 are integrally molded using a molding technique such as insert molding or overmolding with an insulating resin to cover at least a portion and integrate them with the housing 11.

In the present embodiment, in addition to the terminal holding recessed portions 11c and the solder tail openings 11d, the bottom wall portion 11b of the housing 11 includes a secondary terminal holding recessed portion 11g for housing and holding the secondary terminals 65 and a secondary solder tail opening 11h. The secondary terminal holding recessed portion 11g and the secondary solder tail opening 11h are openings passing through the bottom wall portion 11b in the thickness direction.

There is a single secondary terminal holding recessed portion 11g and a single secondary solder tail opening 11h, and a single row of secondary terminals 65 is provided which extends in the width direction of the housing 11. At least a portion of each secondary terminals 65 is embedded in the bottom wall portion 11b. The contact portions 65c are exposed inside the secondary terminal holding recessed portion 11g, and the solder tail portions 65d are exposed inside the secondary solder tail opening 11h. Each contact portion 65c is biased upwards by the spring action of the secondary terminal 65 and contacts the corresponding electrode pad on the card 101 inside the card tray 161 held inside the card connector 1. The tail portion 65d is soldered and electrically connected to a signal line, contact pad, or terminal formed on a board.

The secondary terminals 65 are arranged so as to match the electrode pads on a microSD® card. In other words, when a microSD® card is the card 101 housed inside the card tray 161, the electrode pads arranged on the surface of the card 101 come into contact with the contact portions 65c of the secondary terminals 65.

In the present embodiment, the arrangement of the terminal holding recessed portions 11c and the solder tail openings 11d differ from the arrangement of the terminal holding recessed portions 11c and the solder tail openings 11d explained in the first embodiment.

The terminal holding recessed portions 11c in the present embodiment are arranged in two rows extending in the longitudinal direction of the housing 11. Three terminals 51 are housed in each terminal holding recessed portion 11c, and in each row extends in the longitudinal direction of the housing 11.

The solder tail openings 11d in the present embodiment are divided in two near the rear end portion 11r of the housing 11, but form a single row extending in the width direction of the housing 11. Three tail portions 51d are housed in each solder tail opening 11d, and these form a row extending in the width direction of the housing 11.

Because the tail portions 51d are arranged along the rear end portion 11r of the housing 11, it is easy to visually confirm whether the solder tails 51d have been soldered securely to connecting pads on the board. The same can be said of the tail portions 65d of the secondary terminals 65 arranged along the front end portion 11f of the housing 11.

In the present embodiment, as in the second embodiment, the terminals 51 are arranged in two rows extending in the longitudinal direction of the housing 11 and each row is arranged so that the terminals 51 are positioned differently in the width direction of the housing 11. In other words, the terminals 51 are arranged so that the interval between the apex portions 51c of the pairs of left and right terminals 51 widen as the rear end portion 11r of the housing 11 is approached.

As shown in FIG. 12, the interval between the base portions 51a of the pairs of left and right terminals 51 held by the bottom wall portion 11b in the width direction of the housing, that is, the interval between the base portions 51a of the pairs of left and right terminals 51, widens near the rear end portion 11r of the housing 11. In FIG. 12, the dotted lines indicate the portions of the terminals 51 embedded in the housing 11.

Here, because the tail portion 51d of each terminal 51 runs along the rear end portion 11r of the housing 11, the connecting leg portions 51g connecting the base portions 51a and the tail portions 51d of each terminal 51 extend in the longitudinal direction and pass between the base portions 51a of the pairs of left and right terminals 51 closer to the rear end portion 11r than to the terminals 51. More specifically, the connecting leg portion 51g of the pair of left and right terminals 51 farthest from the rear end portion 11r extends in the longitudinal direction between the base portions 51a of the pair of left and right terminals 51 second farthest from the rear end portion 11r and between the base portions 51a of the pair of left and right terminals 51 third farthest from the rear end portion 11r (closest to the rear end portion 11r) reaching the corresponding tail portion 51d. Similarly, the connecting leg portion 51g of the pair of left and right terminals 51 second farthest from the rear end portion 11r extends in the longitudinal direction between the base portions 51a of the pair of left and right terminals 51 third farthest from the rear end portion 11r, reaching the corresponding tail portion 51d. Therefore, the connecting leg portions 51g are arranged side by side so as to pass between the rows of terminals 51 without overlapping in the thickness direction of the bottom wall portion 11b.

Thus, each terminal 51 is arranged so that the space between pairs of left and right terminals 51 widens as the rear end portion 11r of the housing 11 is approached. This ensures enough space for arranging the connecting leg portions 51g connecting the base portions 51a of each terminal 51 to the tail portions 51*d* and allows the connecting leg portions 51*g* to be arranged properly.

The other configurational elements, operations, and effects are the same as those of the first and second embodiments, so further explanation of these has been omitted.

The present disclosure is not limited to the embodiments described above. Variations based on the spirit of the disclosure are possible, and these do not depart from the scope of the present disclosure.

The present disclosure can be applied to card connectors.

The invention claimed is:

1. A card connector for receiving an inserted card module having electrode pads on one surface, the card connector comprising:
   a housing, the housing having a terminal holding portion; and
   a plurality of terminals, each terminal having a base portion held in the terminal holding portion and a cantilevered arm portion extending from the base portion in a transverse direction relative to an insertion direction of the card module in plan view, the arm portion having a curved portion shaped so as to have a curved surface with a centerline of curvature positioned upwards in side view and a pair of oblique portions inclined relative to an extension direction of the arm portion on both sides of an apex portion positioned on a free end, the terminals contacting the electrode pads of the card module.

2. A card connector according to claim 1, wherein the arm portion includes a flat panel portion connected to the base portion and extending parallel to an upper surface of the terminal holding portion, the apex portion connected to a leading end of the curved portion, and a forward portion positioned above the upper surface of the terminal holding portion.

3. A card connector according to claim 2, wherein the shape of the arm portion in side view does not include an inflection point and a portion of the arm portion connected to the base portion is connected linearly to the base portion.

4. A card connector according to claim 3, wherein the oblique portions include a section positioned above the upper surface of the terminal holding portion.

5. A card connector according to claim 3, wherein the arm portion includes an opening passing through the arm portion in a thickness direction, and the opening has a diamond shape with one axis extending in the extension direction of the arm portion in plan view.

6. A card connector according to claim 5, wherein a width dimension of the section of the arm portion excluding the opening gradually increases linearly towards the base portion from the free end of the arm portion.

7. A card connector according to claim 1, wherein the terminals are arranged in rows extending in the insertion direction of the card module, and the position of the apex portion of each terminal in the rows is different relative to the transverse direction in the insertion direction of the card module.

* * * * *